July 24, 1956  H. F. SMITH  2,756,199
PURIFICATION OF ALCOHOL
Filed Feb. 28, 1952
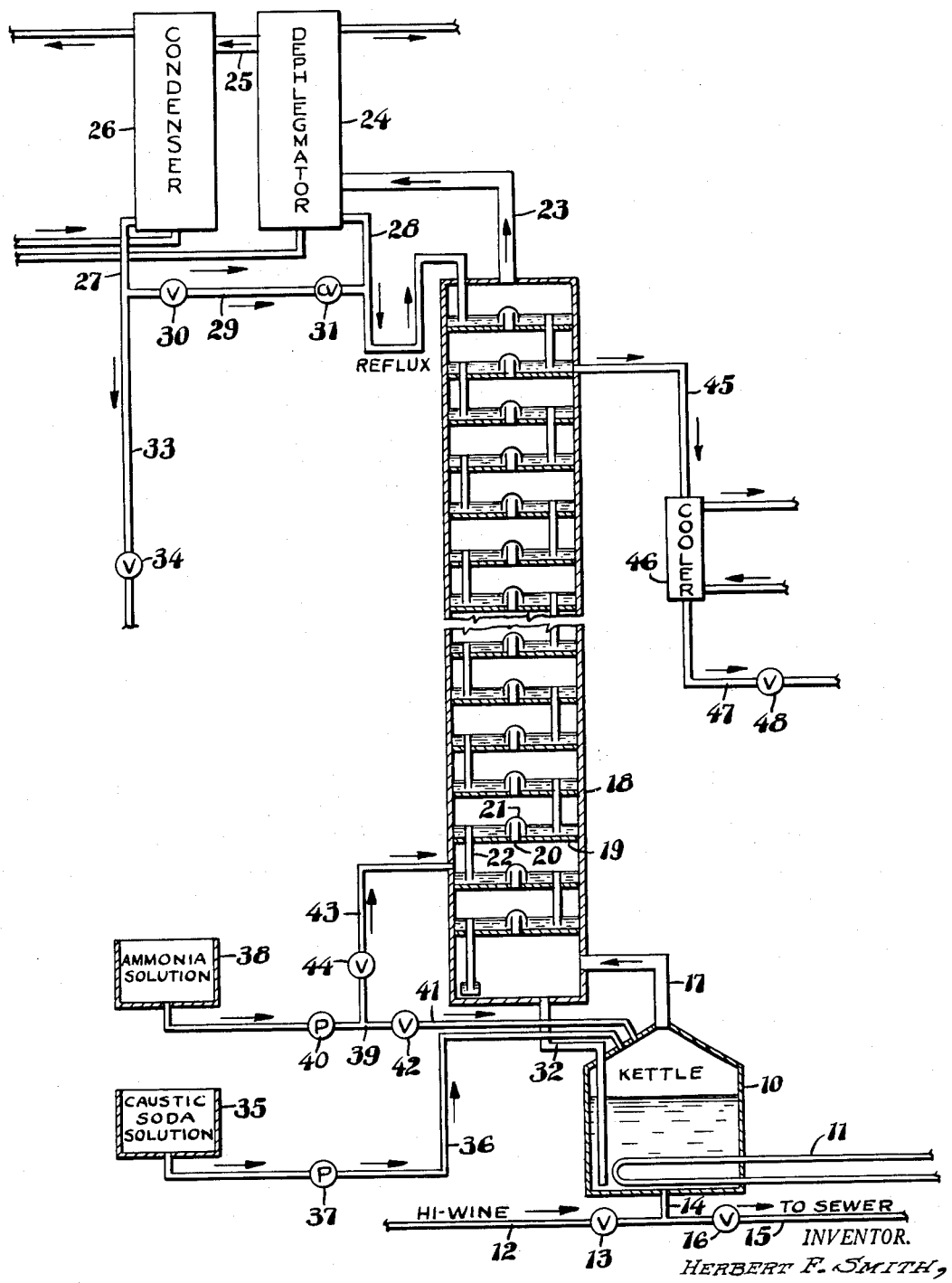
INVENTOR.
HERBERT F. SMITH,
BY: Harold B. Hood.
ATTORNEY.

United States Patent Office 2,756,199
Patented July 24, 1956

2,756,199

PURIFICATION OF ALCOHOL

Herbert F. Smith, West Terre Haute, Ind., assignor to Merchants Distilling Corporation, Terre Haute, Ind., a corporation of Indiana Application February 28, 1952, Serial No. 273,990

15 Claims. (Cl. 202—57)

The present invention relates to the purification of alcohol. While it is believed to be primarily useful in the purification of ethyl alcohol, and while I have thus far tested it only in connection with the production and purification of beverage alcohol, technically referred to as "neutral spirits," I am of the opinion that the invention will find utility also in the purification of any of the lower alcohols.

The primary object of the invention is the provision of a novel procedure for the more perfect removal of impurities from alcohol during the fractional distillation thereof; and I presently believe the invention to be primarily useful in the purification of beverage alcohol or "neutral spirits."

Users of neutral spirits demand a predetermined purity of the product purchased from producers thereof. Almost universally, such users apply what is known as the permanganate test in determining whether or not alcohol so purchased conforms to the purchaser's requirements. When a sample of ethyl alcohol is added to a predetermined volume of potassium permanganate solution of predetermined concentration and the mixture is allowed to stand, the color of the mixture will change after a time period dependent upon the purity of the alcohol sample. The time period varies roughly inversely in proportion to the degree of impurity; viz., the purer the specimen, the longer time will be required for the color change to take place.

Generally speaking, purchasers of neutral spirits require that the purchased product shall give a 50 minute reaction in the permanganate test.

Another test, less widely used, is commonly referred to as the spectrophotometer test.

Neutral spirits are conventionally produced by fractional distillation of the high wines distilled from a fermented mash. Conventionally, the high wines subjected to the fractional distillation contain 50 to 75 per cent alcohol by volume. Neutral spirits must be 95 per cent or more alcohol by volume, and various impurities which form azeotropic mixtures with alcohol, and the nature and composition of which are not very well understood, are normally present in neutral spirits in greater or lesser proportions. The major constituent of the 5 or less per cent by volume is water; but it is the other impurities, above mentioned, which produce the color change of the permanganate test. I presently believe these other impurities to be substances whose azeotropic mixtures with alcohol have boiling points very closely approximating that of pure ethyl alcohol, and which, therefore, cannot be successfully separated by fractional distillation.

It is conventional in the art to add a caustic or other strong base to the high wines before distillation; and it has been found that the purity of the resulting neutral spirits is thereby improved. It is supposed that the caustic material, usually sodium hydroxide, enters into some sort of chemical reaction with the impurities present in the high wines in the liquid phase, thereby changing the character of those impurities, and producing substances whose boiling point differs more widely from that of ethyl alcohol, whereby those impurities are separated by the fractional distillation.

In one process with which I a familiar, however, the use of conventional procedures, including the addition of sodium hydroxide in conventional proportions, has consistently resulted in the production of an end product which, when subjected to the permanganate test, has given a time reaction of 35 to 40 minutes; and when subjected to the spectrophotometer test, has shown an unsatisfactory degree of purity. Various expedients known to the art having been tried without substantially affecting the purity of the end product, I proceeded to a hitherto untried expedient, with amazing results.

To the accomplishment of the above and related objects, my invention may be embodied in the form illustrated in the accompanying drawings and in the steps described hereinbelow, attention being called to the fact, however, that the drawings and description are illustrative only, and that change may be made in the structure illustrated or in the specific steps stated, so long as the scope of the appended claims is not violated.

The single figure illustrates, more or less diagrammatically, one form of apparatus through the use of which my improved process can be carried out.

I have illustrated structure which is conventional, except for certain modifications which will be pointed out hereinafter, in the fractional distillation of high wines to produce neutral spirits. Similar apparatus may be used in the production of other alcohols from suitable starting materials. As shown, the apparatus comprises a kettle 10 adapted to be heated by a steam line 11 or any other heating means. As shown, a conduit 12 leads from a storage vat (not shown) and includes a valve 13 controlling flow to a conduit 14 communicating with the interior of the kettle 10. A discharge line 15, controlled by a valve 16, also communicates with the conduit 14.

From the top of the kettle 10, a conduit 17 is adapted to lead vapors to the bottom of a conventional plate column 18. As is well understood, the column 18 encloses a series of plates 19, each of which is formed to provide a vapor conduit 20 guarded by a dome or bell 21; and each plate is provided with a reflux pipe 22 whose mouth is located above the level of the mouth of the corresponding bell 21, and which discharges to the next lower plate 19. Thus, liquid is retained, to a predetermined depth, on each of the plates 19; and vapor may flow, through each conduit 20, from the next lower space in the column, to bubble through the liquid on each plate.

From the top of the column, an effluent conduit 23 conducts vapor away from the column. Preferably, the conduit 23 leads to a dephlegmator 24, suitably cooled; and a pipe 25 leads from the dephlegmator 24 to a condenser 26 which is also suitably cooled. Condensate is withdrawn from the condenser 26 through a line 27. Some condensate will be drawn, through a line 28, from the bottom of the dephlegmator, said line 28 leading back to the top plate of the column 18.

Thus far, the structure described is conventional. According to the present invention, a pipe 29, controlled by a manually manipulable valve 30, and including a check valve 31, provides selective communication between the line 27 and the line 28 whereby a desired proportion of the liquid withdrawn from the condenser 26 may be returned, through the line 28, to the top of the column 18. That portion of the condensate withdrawn from the condenser 26 which is not so returned will flow, through a line 33 controlled by a valve 34, to a collector (not shown).

As has been stated above, it is conventional to add a precalculated amount of caustic, such as sodium hydroxide, to the kettle; and I have shown a conventional tank 35 for caustic soda solution which is fed to the kettle through a conduit 36, by means, for instance, of a pump 37. This, too, is conventional construction.

In a system as thus far described, the end product of the process, neutral spirits, would be withdrawn from the system through the line 33. It is such a system which, as described above, has for a long time produced neutral spirits giving a 35 to 40 minute reaction under the permanganate test.

According to the present invention, I have added to the above-described apparatus a further tank 38 containing a supply of ammonium hydroxide in aqueous solution. A line 39, including a pump 40, leads from the tank 38 and to a conduit 41, controlled by a valve 42, and leading to the kettle 10. As shown, I provide also a conduit 43, controlled by a valve 44, and adapted to lead the solution forwarded by the pump 40 directly into the column 18 at one of the lowermost plates in said column. I have found that satisfactory results can be attained whether the ammonia solution is introduced into the kettle 10 or directly into the column 18 near the bottom thereof.

Also, I provide a conduit 45, opening into the column 18 at the level of one of the uppermost plates therein, whereby liquid may be drawn from the selected plate. I prefer to connect the pipe 45 at the second or third plate from the top of the column, though I presently believe that it may be connected into the column as low as the eighth plate from the top, in a still whose column includes approximately thirty-eight plates.

Essentially, the pipe 45 must communicate with the column at a point at which the temperature is below the boiling point, at the pressure there obtaining, of the alcohol which is being produced; but above a value at which ammonia (NH₃) can be retained in solution in that alcohol under such pressure conditions. When the end product of the process is ethyl alcohol or neutral spirits, I prefer to connect the pipe 45 at a point at which the pressure is but a few ounces above atmospheric and the temperature is 78° C., but I presently believe that satisfactory results can be obtained even if the temperature and pressure at the point of connection of the pipe 45 are somewhat higher. Obviously, where the end product is an alcohol having a lower boiling point or a higher boiling point than that of ethyl alcohol, a different temperature will exist at the point of connection of the pipe 45; but I presently believe that the temperature at the point of connection should closely approximate the boiling point of the alcohol being obtained, under the pressure conditions existing at such point of connection.

The pipe 45 leads through a suitably cooled cooler 46; and thence a pipe 47, controlled by a valve 48, leads to a point of collection (not shown) of the end product.

According to the present invention, a suitable volume of high wines will be introduced into the kettle 10 through the line 12, valve 13 and conduit 14; and a suitable proportion of a base, such as sodium hydroxide in solution, will likewise be introduced into the kettle from the vat 35 and through the line 36. Now, the kettle will be heated until the mixture begins to boil and vapor will rise from the mixture and will flow through the conduit 17 and thence to and through the tower 18. As vapor begins to flow, the pump 40 will be started. One or both of the valves 42 and 44 will be open to permit flow of ammonium hydroxide in aqueous solution to the kettle and/or to the lower portion of the tower 18.

The temperature at which ammonia (NH₃) will be liberated from such an aqueous solution is so low that, in my opinion, ammonium hydroxide as such will never enter the liquid mixture in the kettle 10. Instead, the ammonia will immediately flash to its gaseous phase and will move, in contact with the vapors rising from the kettle 10, through the tower 18. Gaseous ammonia will thus move through the tower, in contact with the alcohol and other fractions in the gaseous phase. I presently believe that a chemical combination occurs between the gaseous ammonia and some of the impurities contained in the vapors flowing through the tower, whereby new compounds are formed. These compounds, I presently believe, include compounds having boiling points which are either substantially higher or substantially lower than the boiling point of ethyl alcohol, whereby the impurities included in those compounds will be separated from the alcohol. Any such compounds having boiling points substantially higher than that of ethyl alcohol will, of course, flow as reflux downwardly through the pipes 22; while those having boiling points substantially lower than that of the alcohol will remain in the gaseous phase and will be withdrawn through the conduit 23 from the top of the tower.

I have found that, when this process is practiced, the liquid withdrawn through the pipe 45 produces a permanganate reaction of 52 to 71 minutes, and will average a 58-minute reaction; whereas, as stated above, the permanganate reaction time of the same process, when no ammonia was added and when the end product was withdrawn through the conduit 23 and passed through the dephlegmator 24 and the condenser 26, was 35 to 40 minutes.

The ammonium hydroxide solution must be added to the process continuously as the distillation proceeds; and it must be added in sufficient quantity so that a detectable ammoniac odor is imparted to the effluent withdrawn through the line 33. No maximum limit appears to exist. That is, so long as there is added to the process at least enough ammonium hydroxide to impart a detectable ammoniac odor to the effluent withdrawn through the line 33, addition of further quantities of ammonium hydroxide apparently has no effect upon the process. It may be said, then, that ammonia must be introduced into the process in a quantity at least sufficient to impart the detectable odor of ammonia to the effluent withdrawn through the line 33.

While an aqueous solution of ammonium hydroxide appears to be the most convenient medium through which ammonia (NH₃) may be introduced into the process, it will be clear that other media may be used to that end. It is ammonia (NH₃) which is active in the process and, except for considerations of convenience and cost, I believe that any substance which will readily release ammonia, when introduced into the process, may be effectively used.

So long as the end product is withdrawn in the liquid phase from the column at a point at which the temperature is sufficiently high to keep ammonia (NH₃) out of solution in the product, it is found that the product is completely uncontaminated by ammonia. A small fraction of the condensate of the vapors escaping from the tower through the line 23, will be continuously withdrawn through the line 33 and delivered to a point of collection. The major fraction of such condensate will be returned, through the lines 28 and 29, to reflux the column. The ammonia-laden fraction withdrawn through the line 33 can be freed from ammonia by aeration; and is available for sale as denatured alcohol. It is found to contain a high proportion of impurities, the specific characters of which are at present unknown to me.

I believe that this fraction can probably be purified by subsequent treatment in accordance with the presently-disclosed method; but I am not at present prepared to say definitely that this is possible.

While the process above described is presently believed to be the optimum procedure for utilizing my discovery, I have found that it is possible to obtain improved results in other ways. Thus, while optimum results are obtained, as described above, by using a caustic or another strong base directly in connection with the introduction of ammonia to the distillation procedure, I have found that the introduction of ammonia, in the manner above described, is quite effective in the purification of ethyl alcohol, even if no other basic material is used in the process. Thus tests have shown that, where ammonia is used alone, the resultant ethyl alcohol has a 51-minute permanganate reaction time, as against the 35 to 40-minute reaction time of the product resulting from the use of sodium hydroxide alone, and as against the average 58-minute reaction time where both sodium hydroxide and ammonia are used.

While sodium hydroxide is specifically mentioned above, because it is most conventionally used in the distillation procedures known prior to my invention, of course potassium hydroxide could also be used; and I presently believe that milder bases such as, for instance, calcium hydroxide and similar substances, could be used in place of the sodium hydroxide without at all affecting the action of the ammonia, whose use is the characteristic and primarily essential feature of my invention.

Again, I have found that improved results are produced when the conventional distillation, using sodium hydroxide, is followed by a separate and independent distillation using ammonia. The latter procedure resulted in a product having a 51-minute permanganate reaction time. The procedure wherein both sodium hydroxide and ammonium hydroxide are used in the same distillation, however, gives excellent results and is, in my present opinion, the optimum procedure for commercial operation.

I have described the invention in a batch distillation process. Continuous processes are known; and I believe my invention to be applicable, as well, to those processes. In conventional continuous stills, the vapors from the high wines are fed continuously through a series of three columns, commonly referred to, in the succession in which they are arranged in the process, as the aldehyde column, the alcohol or spirit column and the fusel oil column. In such a system, the ammonia would be introduced into the process continuously along with the high wine vapors; and the excess ammonia would be withdrawn from the process along with the condensate from the aldehyde column. Hot liquid from one of the plates of the aldehyde column, would pass, in ammonia-free condition, into the spirit column where it would be further refined, in the conventional manner.

I presently believe that no further treatment, beyond that above described, will be required. It is possible, however, that the ammonia, or some compound thereof, coming into contact with the copper linings of the dephlegmator or condenser, may attack those linings to introduce some sort of copper compounds, through the lines 28 and 29, into the system; and that those compounds might appear, in trace proportions, in the effluent through the pipe 45. If that should occur, of course the copper salts can be readily removed by running the finished product, withdrawn through the pipe 45, through a revaporizer.

Some known processes intended to improve the purity of the end product of alcoholic distillation have been found to give better results in the permanganate test, but to give less satisfactory results in the spectrophotometer tests. The end product of my process, on the other hand, shows improvements under the spectrophotometer tests entirely analogous to the improvements above described in the permanganate tests.

I claim as my invention:

1. The method of purifying ethyl alcohol which comprises the steps of distilling high wines in a plate column while continuously introducing ammonia ($NH_3$) from an external source to the still near the bottom of the column and withdrawing liquid alcohol from the column near, but below, the top of the column, while separately withdrawing vapors containing excess ammonia from the column.

2. The method of purifying ethyl alcohol which comprises the steps of distilling high wines in a plate column while continuously introducing ammonia ($NH_3$) from an external source to the still near the bottom of the column and withdrawing liquid alcohol from the column near, but below, the top of the column, the ammonia being introduced in quantities sufficient to impart a detectable ammoniac odor to vaporous effluent separately withdrawn from the top of the column.

3. The method of purifying ethyl alcohol which comprises the steps of distilling high wines containing a caustic in a plate column while continuously introducing ammonia ($NH_3$) to the still near the bottom of the column and withdrawing alcohol from the column near, but below, the top of the column.

4. The method of purifying ethyl alcohol which comprises the steps of distilling high wines containing a caustic in a plate column while continuously introducing ammonia ($NH_3$) to the still near the bottom of the column and withdrawing alcohol from the column near, but below, the top of the column, the ammonia being introduced in quantities sufficient to impart a detectable ammoniac odor to the effluent from the top of the column.

5. The method of purifying ethyl alcohol which comprises the steps of distilling high wines in a plate column while continuously introducing ammonium hydroxide from an external source to the still near the bottom of the column and withdrawing liquid alcohol from the column near, but below, the top of the column, while separately withdrawing vapors containing excess ammonia from the column.

6. The method of purifying ethyl alcohol which comprises the steps of distilling high wines in a plate column while continuously introducing ammonium hydroxide from an external source to the still near the bottom of the column and withdrawing liquid alcohol from the column near, but below, the top of the column, the ammonium hydroxide being introduced in quantities sufficient to impart a detectable ammoniac odor to vaporous effluent separately withdrawn from the top of the column.

7. The method of purifying ethyl alcohol which comprises the steps of distilling high wines containing sodium hydroxide in conventional proportions in a plate column while continuously introducing ammonia ($NH_3$) to the still near the bottom of the column and withdrawing alcohol from the column near, but below, the top of the column.

8. The method of purifying ethyl alcohol which comprises the steps of distilling high wines containing sodium hydroxide in conventional proportions in a plate column while continuously introducing ammonia ($NH_3$) to the still near the bottom of the column and withdrawing alcohol from the column near, but below, the top of the column, the ammonia being introduced in quantities sufficient to impart a detectable ammoniac odor to the effluent from the top of the column.

9. The method of purifying ethyl alcohol which comprises the steps of distilling high wines containing sodium hydroxide in conventional proportions in a plate column while continuously introducing ammonium hydroxide to the still near the bottom of the column and withdrawing alcohol from the column near, but below, the top of the column.

10. The method of purifying ethyl alcohol which comprises the steps of distilling high wines containing sodium hydroxide in conventional proportions in a plate column while continuously introducing ammonium hydroxide to the still near the bottom of the column and withdrawing alcohol from the column near, but below, the top of the column, the ammonium hydroxide being introduced in quantities sufficient to impart a detectable ammoniac odor to the effluent from the top of the column.

11. The method of purifying ethyl alcohol which comprises the steps of distilling high wines containing sodium hydroxide in conventional amounts in a plate column while continuously introducing aqueous ammonium hydroxide into the kettle throughout the distillation, withdrawing alcohol in the liquid phase from one of the column plates below the top plate but above the ninth plate from the top, condensing the effluent from the top of the column, continuously withdrawing a minor portion of such condensed effluent, and directing a major portion of such condensed effluent back to reflux the column.

12. The method of purifying ethyl alcohol which comprises the steps of distilling high wines containing sodium hydroxide in conventional amounts in a plate column while continuously introducing aqueous ammonium hydroxide into the kettle throughout the distillation in quantities sufficient to impart a detectable ammoniac odor to the effluent from the top of the column, withdrawing alcohol in the liquid phase from one of the column plates below the top plate but above the ninth plate from the top, condensing the effluent from the top of the column, continuously withdrawing a minor portion of such condensed effluent containing a major portion of the excess ammonia, and directing a major portion of such condensed effluent back to reflux the column.

13. The method of purifying ethyl alcohol which comprises the steps of distilling high wines containing sodium hydroxide in conventional amounts in a plate column while continuously introducing aqueous ammonia hydroxide into the column at a point above the lowermost plate thereof throughout the distillation, withdrawing alcohol in the liquid phase from one of the column plates below the top plate but above the ninth plate from the top, condensing the effluent from the top of the column, continuously withdrawing a minor portion of such condensed effluent, and directing a major portion of such condensed effluent back to reflux the column.

14. The method of purifying ethyl alcohol which comprises the steps of distilling high wines containing sodium hydroxide in conventional amounts in a plate column while continuously introducing aqueous ammonium hydroxide into the column at a point above the lowermost plate thereof throughout the distillation in quantities sufficient to impart a detectable ammoniac odor to the effluent from the top of the column, withdrawing alcohol in the liquid phase from one of the column plates below the top plate but above the ninth plate from the top, condensing the effluent from the top of the column, continuously withdrawing a minor portion of such condensed effluent, containing a major portion of the excess ammonia, and directing a major portion of such condensed effluent back to reflux the column.

15. The method of producing alcohol of a purity represented by a reaction time of at least fifty minutes in the conventional permanganate test, which comprises the steps of distilling an alcohol-bearing mixture while continuously bringing ammonia ($NH_3$) from an external source into intimate contact with the alcohol while in the gaseous phase, condensing alcohol from the gaseous mixture under temperature and pressure conditions approximating the boiling point of the alcohol, and withdrawing the condensate in the liquid phase, while separately withdrawing vaporous ammonia and contaminants, the ammonia being introduced at a rate and in quantity sufficient to impart a detectable ammoniac odor to the mixture so separately withdrawn.

References Cited in the file of this patent

UNITED STATES PATENTS

| | | |
|---|---|---|
| 1,798,713 | Wait | Mar. 31, 1931 |
| 1,933,556 | Jewett | Nov. 7, 1933 |
| 1,987,601 | Burke | Jan. 15, 1935 |
| 2,091,030 | Davis | Aug. 24, 1937 |
| 2,126,611 | Britton | Aug. 9, 1938 |
| 2,139,179 | Tulleners | Dec. 6, 1938 |
| 2,207,111 | Rodenburg | July 9, 1940 |
| 2,227,485 | Bump | Jan. 7, 1941 |
| 2,461,048 | Frejacques | Feb. 8, 1949 |

OTHER REFERENCES

Robinson and Gilliland: "Elements of Fractional Distillation," 3rd ed., pub. 1939, by McGraw-Hill Book Company, New York, N. Y., pages 75–80.